G. G. PERCIVAL.
Process and Apparatus for Extracting Essential Oils.
No. 133,719. Patented Dec. 10, 1872.
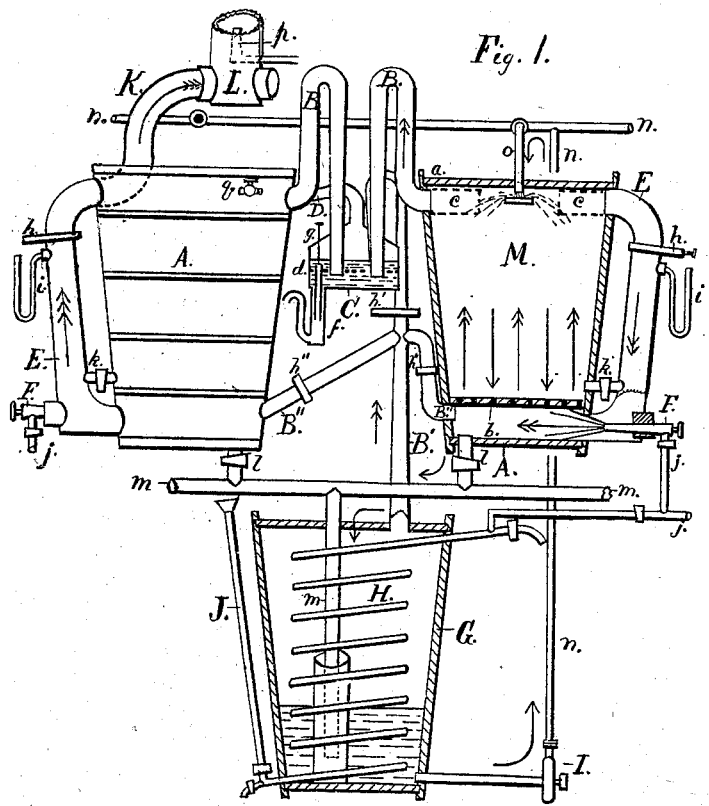
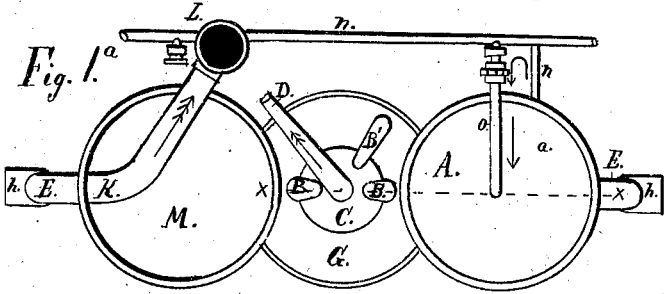
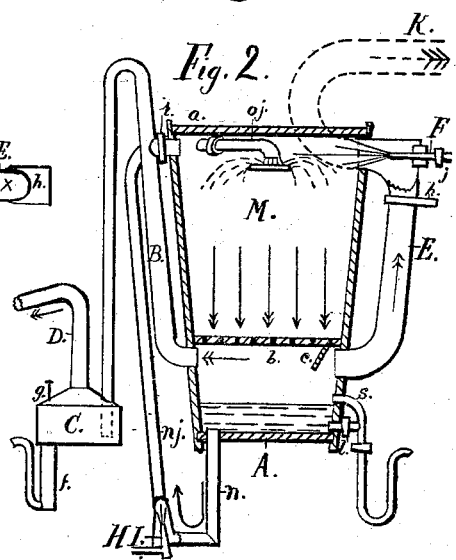
WITNESSES:
James H. Plaisted
Joseph C. Avore
INVENTOR:
George Gilman Percival.

UNITED STATES PATENT OFFICE.

GEORGE G. PERCIVAL, OF WATERVILLE, MAINE.

IMPROVEMENT IN PROCESSES AND APPARATUS FOR EXTRACTING ESSENTIAL OILS.

Specification forming part of Letters Patent No. 133,719, dated December 10, 1872.

*To all whom it may concern:*

Be it known that I, GEORGE GILMAN PERCIVAL, of Waterville, in the county of Kennebec and State of Maine, have invented certain Improvements in Process and Apparatus for Extracting Essential Oils, of which the following is a specification:

The first part of this invention relates to an improvement in the process of extracting essential oils from the substances naturally containing them. According to this improvement, instead of boiling the charge with water, or of simply passing steam through charge, with or without previous maceration in cold water, as is commonly practiced, I first treat the charge with boiling or very hot water, and then draw off this hot water and extract the oil by passing steam through charge. This preliminary treatment with hot water softens or acts upon the charge in such a manner that steam will extract the oil more readily than before such treatment. This preliminary treatment with hot water may be in either of the following ways: First, I may boil the charge a short time with water, or macerate it a longer time with hot water, and then draw off the water; or, second, I may percolate or drench the charge with boiling or hot water, and then stop percolating and draw off water. I prefer the latter mode, as being more convenient in practice, and while passing steam through charge I prefer to let a little boiling water trickle down through charge, just enough to keep it moistened. The object of this part of the invention is to extract by steam oils from certain substances usually distilled with water. This process is especially adapted to charges more or less dry, and I claim for it no advantage with perfectly fresh charges of herbs which, like peppermint, cedar, &c., readily yield their oil to steam while fresh.

I do not claim any preliminary treatment with cold water; nor do I claim extracting oil from charge by passing steam through it, unless such charge has been previously treated with hot water and the hot water drawn off.

The second part relates to giving to the steam used to extract the oil a circulatory motion, so that the bulk of the steam may pass through the same charge more than once, instead of once, as in the common process of extracting oil of peppermint. The object is to obtain a greater percentage of oil in the distillate. In the common process, where the steam is passed through the same charge but once, it is seldom, if ever, perfectly saturated with the vapor of the oil, and for this reason is frequently passed through a second charge. The third part relates to cooling the exhausted charge by drawing air down through it. The object is convenience in unloading. As the steam and hot-air are drawn down and away from the workmen the still may be unloaded with less inconvenience than where the steam and hot air rise from the top of the still. The fourth part relates to the combination of a still for extracting essential oils and a device for imparting to the steam the circulatory motion mentioned in the second part. I call such a device a "steam-circulator." The fifth part relates to the combination of a still for extracting essential oils and a device for drawing the air down through the exhausted charge. I call such device a " cooler." The sixth part relates to the combination of one or more stills for extracting essential oil and a " hydraulic main" similar to those in common use in gas-works. The object of the combination is to enable several stills to be used with one condenser without connecting and unconnecting the pipes.

The present application is a subsequent improvement on patents Nos. 110,998 and 120,596, issued to me January 17 and November 7, 1871, and I shall describe, but not claim, some of the combinations covered by said patents.

General Description.

Figure 1 represents two similar stills with attachments. The right-hand one is in vertical central section along line $x\ x$, Fig. 1$^a$, while distilling. The left-hand one is in front elevation, with " cooler" attached, while cooling exhausted charge. Fig. 1$^a$, plan of same; Fig. 1$^b$, side elevation of same; Fig. 2, vertical central section of modification.

Similar letters of reference indicate like parts. Single-barbed arrows represent direction of water in distilling; double-barbed ones, the direction of steam impregnated with vapor of oil; triple-barbed ones, the direction of current of air in cooling exhausted charge.

Description of Fig. 1.—A A represent the still-bodies, of which there may be one or more. They are wooden tanks, seven feet high, five feet wide at top, and three and one-half feet at bottom. The cover $a$ is movable, and can be rendered tight by oakum or other suitable packing. $b$ is a perforated false bottom, eight inches above true bottom. B is a six-inch copper tube, conveying the impregnated steam from A to "hydraulic main" C. C is equivalent to the device of the same name used in gas-works, and answers the same purpose. It will be seen that several pipes, B, B, and B', from as many different stills, terminating below the surface of the water in the same vessel C. D is a six-inch pipe conveying the impregnated steam from C to the condenser, not shown in the drawing, but like those in common use. $c\,c$ are perforated movable copper caps placed on ends of B and E during distillation to keep out portions of charge. $d$ is perforated false bottom to C. $e$ is siphon-tube for filling C, not shown in drawing. $f$, a sliding overflow-tube to regulate amount of liquid remaining in C; $g$, handle to same passing through steam-tight packing in cover of C. E and F together constitute the "steam-circulator." E is an eight-inch copper tube, of shape shown. It is provided with a sliding gate, $h$, and a pressure-gage, $i$, consisting of a bent glass tube with bend filled with colored water. F is a steam-jet connected by tube $j$ with a steam-boiler furnishing steam at a pressure of forty pounds to square inch, more or less. It is preferable to have F so constructed that the orifice may be adjustable. When used for circulating steam, with an open charge like cedar, one-fifth inch or one-quarter inch orifice will do, but with more compact charges, or when used to heat water, a larger orifice is desirable. This jet is so placed that the escaping cone of vapor shall just fill the contracted end of E and cause a downward draft in E, as in steam-jet ventilators. $k$ is a four-inch tube with cock, used only when I heat water in A by jet F. $l$ is a four-inch pipe with cock to completely empty still. The pipes $l\,l$ of a series of stills are connected with pipe $m$. One end of $m$ terminates in a waste-cock. The other end is closed, but a branch with cock (cock not shown in drawing) terminates in a tall vessel in G, forming a steam-trap. G is a wooden tank, same size as A, with permanent cover. B' is a pipe for conveying impregnated steam from G to C. B' has a gate, $h'$, and from below this gate may send branches B'' B'', each with gate $h''$, to tanks A A. H is a coil of one and one-fourth inch copper or lead pipe, with cock at each end. H is used mainly to heat and boil water in G, and is supplied with steam by pipe $j$. The condensed steam is drawn off by a small cock at lower end. With expensive oils it is sometimes desirable to cool the water in G. This can be accomplished by pouring cold water into tube J, connected with lower end of H. I is a centrifugal pump placed a little lower than G, and capable of filling the two-inch pipe $n$. This pipe $n$ runs horizontally back of and above series of stills. Connected with $n$ by a cock and union is a branch, $o$, to each still. This branch $o$ is permanently connected with cover $a$, and impinges on a metallic plate under this cover so placed as to scatter or sprinkle the water over top of charge.

The tank G corresponds to "oil extractor" B in above-mentioned patent, No. 120,596, $l$ to $c$, $m$ to $d$, I to C, $n$ to $k$, and $o$ to $i$, same patent. I do not here claim any of the combinations there patented.

K is an eight-inch pipe, used only to cool exhausted charge. It connects top of E with chimney or stove-pipe L, fitting tightly into thimble in L. One pipe, L, will answer for a series, and the taller the better. $p$ is a steam-jet for starting a current in L. Where we have other means of starting the current it may be dispensed with. $q$, air-cock; M, charge in still. I may have a pressure-gage so constructed as to let air into still A whenever there is a partial vacuum—not shown. All parts should be well protected from loss of heat by radiation.

To use, I vary the process with the age of the charge:

First, suppose I have a perfectly-fresh charge of cedar, cut within a few hours. As I claim no advantage for the first part of this invention, in this case I do not use it; nor do I use the parts B' B'' G H I J $k\,n$, nor $o$. I use $l$ and $m$ only to let out water condensed in heating charge. When cover is properly packed I let on steam by jet F. This jet of steam draws down through E a current of the impregnated steam, which has already passed up through charge, and forces it up through again. I continue this until the charge is exhausted. The bulk of steam in the still circulates round and round, and most of it passes through the same charge several times. This illustrates the second part of my invention, and the combination of A with E and F illustrates the fourth part.

I can at any time test the action of the "steam-circulator" by closing gate $h$ and observing $i$. When charge is exhausted I remove cover $a$ and connect E with L by K in manner shown. If a current of heated air does not start spontaneously in L I start one by the temporary action of jet $p$. A current of the cold surrounding air is then drawn down through the exhausted charge, cooling the charge; but itself, becoming warmed and rising through E, escapes by the top of L, carrying with it most of the steam given off by the cooling charge. This current, once started, will continue until the charge is cooled, or until the air ceases to be warmed in its downward passage through still. This downward passage of air illustrates the third part of my invention, and the combination of A with E, K, and L, the fifth part.

Second, in case I have a charge quite dry—e. g., cedar three months old—I employ the first part thus: After maceration in cold water I give charge a preliminary treatment with boiling or hot water. This preliminary treatment may be by percolating or by boiling. I will describe by percolating first. Let the cold water of maceration into G, heat it by steam-coil H, and in the meantime run pump I at full speed. This forces water up $n$, down $o$, and drenches charge with the gradually-heated water. In time both charge and water are heated to 212°, and steam escapes by B' to C. Then I cut down steam from H, leaving on a little to supply loss of heat by radiation, and continue this percolating or drenching an hour, more or less, depending upon nature and dryness of charge. Then I stop the drenching, letting out all the water in A, and let on steam by jet F. At first the oil comes over quite fast, but in time the percentage in distillate diminishes. I then shut off steam from F and drench again a shorter time than before—say fifteen minutes; then steam again. The oil again comes quite rapidly for a time, and then the percentage in distillate again diminishes. I repeat the drenching, and so proceed, alternately drenching and passing steam through, until charge is exhausted. Instead of these alternate drenchings and steamings, after the charge is thoroughly drenched and softened, in the first place I may, simultaneously with passing steam through, percolate with a little water—just enough to trickle down through charge and keep it wet, but not enough to interfere with the circulation of the steam. I can regulate this amount by cock in $o$. This illustrates the first part of my invention.

When it is decided to perform the preliminary treatment by boiling instead of percolating or drenching, I proceed as follows: I let on steam by F to A, containing charge and water of maceration, closing gate $h$ and opening cock $k$. When charge is sufficiently softened I let out water and extract oil from charge by steam, as above. At first, oil comes rapidly and then in less quantity, and I pump up the water and give it a short boil at intervals until charge is exhausted. Exhausted charge is cooled as before.

Third, in case I have cedar slightly dried—say cut two weeks—I may proceed as in second case where I have quite dry cedar; but I prefer first to proceed as in first case where I have fresh cedar, steaming without any preliminary treatment until I have extracted all the oil that the steam will readily bring over. The quantity of oil so obtained is less than with fresh cedar, and I do not get all that the charge contains. I then proceed according to the first part of this invention, (drenching and passing steam through alternately or simultaneously,) and get more oil.

In case I have a charge which, like teaberry, yields an oil quite soluble in hot water, I prefer to extract about three-fourths of the oil by the process described and patented in said patent No. 120,596, and the last part of the oil by the first part of this invention, as follows: Macerate charge in cold water and let this down into G. I heat and boil this water by steam-coil H, running pump I continually full head until about three-fourths of oil are extracted. The water extracts the oil from charge, carries it to G, and there gives it off to steam generated by steam-coil H. This steam passes via B' to C, (according to process more fully described in said patent.) I then stop or very much diminish the currents of water, so that only a little will trickle down through charge, and shut off most of the steam from coil H. I pass the steam generated in G via B' and B'' into bottom of A, and let on steam to jet F, and proceed as first above described.

Chemicals, such as salt, acid, alcohol, &c., may be added to water used in preliminary treatment. I generally use none, but use the same water over and over, cooling it to macerate fresh charges without exposing it to air, by pouring cold water through coil H by pipe J. For cheap oils, like cedar, the hot water remaining from previous operations may be used for maceration. A little fuel is thus saved, but I think at the expense of a little oil.

Modifications.

Description of Fig. 2.—This represents a still requiring no pump A, as in Fig. 1, but one foot deeper. False bottom $b$ is two feet above true bottom. B proceeds from under this false bottom, but has a branch, $r$, with gate connecting it with top of A. E, similar to E in Fig. 1, but reversed in position, so as to cause a circulating current down through charge. F need not be adjustable, and can be placed in lower part of E, pointing up, if desired; $c$, shelf to keep water out of E. $n$, H I, $n j$, and $o j$, together constitute a "heater," as described in Fig. 1, said patent No. 110,998, ($n$ corresponding to $g$, steam-jet H I to $e$, $n j$ to $d$, and $o j$ to $f$ in said figure.) Steam-jet H I draws the water down $n$, heats and boils it, forces it up $n j o j$, and discharges it on top of charge. (As it thus answers the purpose of both H and I in Fig. 1, I have given it the double lettering.) $l$, pipe for completely emptying still; $s$, overflow-tube, with cock so placed as to retain about twelve inches of water in A. K, indicated by dotted lines, is a tube used only in cooling exhausted charge. One end fits in E and the other may terminate in any waste space—e. g., pass through side of building.

To use with a dry charge, like cedar, I macerate and then open cock in $s$, drawing off water to level of this tube. I then let on steam by jet H I, using a large orifice, until the water and charge are heated to 212°, when I diminish orifice. The gates in E and $r$ being closed the steam and water both pass down through charge.

This illustrates the first part of my invention, (drenching and passing steam through alternately or simultaneously,) and differs from the process described in said patent No. 110,998, and from patent No. 86,803, issued to Gideon Bantz, February 9, 1869, from the fact the steam, as well as the water, passes through the charge. There water alone passes through. This process is preferable for oils almost insoluble in water. By opening gate $h$ in E, and letting on steam by jet F, I cause the steam to circulate, thus employing the second part of this invention. To cool exhausted charge I remove cover $a$, put on K, and let on steam to jet F, and keep it on till charge is cooled or removed. This jet draws air down through charge, up E, and discharges it at remote end of K. The water in C prevents air entering A by B.

To use with teaberry, I fill A half full with water, open gate in $r$, and use, as described in said patent No. 110,998, until three-fourths of oil are extracted, then draw off water by $s$, close gate in $r$, and extract the remainder by circulating steam.

By adding an extra steam-jet, F, pointing downward to the heater of a still constructed as described in Fig. 1, said patent No. 110,998, I make a cheaper, but less convenient still. To use I partly fill with water, and use as there described for preliminary treatment, then draw off water and let on steam by the extra jet F, to extract oil by circulating steam.

The preliminary treatment by boiling can be accomplished in metallic vessels over fire or in tanks heated by steam-coils; but I consider this a less convenient mode. Again, the steam may be caused to circulate by fan-blowers; but I consider it less convenient than by steam-jets. The air used to cool exhausted charge may be drawn down through charge by an exhaust-fan or by a column of falling water, as in the trombe or Bunsen's air-pump.

Oil has been extracted by passing steam into tanks containing charge and water; but this process is much inferior to mine, for the water interferes with the free circulation of the steam.

In describing Fig. 5, said patent No. 120,596, I described, but expressly disclaimed, a modification of the first part of this invention.

The heater described in said patent No. 110,998, Fig. 1, differs from the steam-circulator here claimed in the important point that the steam-jet $e$ in the former points toward pipe B leading to condenser, whereas in the latter the jet F points away from corresponding pipe B. Should any one, after drawing off the water, attempt to use the heater for a steam-circulator, part of the steam might pass to the condenser without ever passing through charge.

All the claims in said two patents Nos. 110,998 and 120,596 are in all cases to take precedence to the claims in the present application, in case they conflict.

The first, second, and fourth parts of my invention differ from the process and apparatus described in said patent 86,803, issued to Gideon Bantz, February 9, 1869, in this among other important points, viz: I pass the impregnated steam to condenser from the end of the still opposite to that by which it is admitted to charge; while he passes it from the same end by which it is admitted. Therefore, in my invention the whole of the steam must pass through charge once, and the bulk of it many times. In his invention a few bubbles may be mechanically (to quote his patent) "carried down by the jets into the mass of water, and among the materials to be acted upon;" but the bulk of the steam does not pass into charge, and it is very doubtful if any passes through.

I do not claim the combination of a steam-circulator; nor of a steam-jet; nor of a hydraulic main; nor of a cooler with anything else than with stills for extracting essential oils; for I am aware that each of the first three have been combined with the other devices, such as bucking-kiers, leach-tubs, apparatus for treating corn, gas-retorts, &c.

What I claim as my invention is—

1. The process of extracting essential oils by first giving the charge a preliminary treatment with hot water, and then passing steam through charge after having drawn off this water.

2. Giving a circulatory movement to the steam used to extract the oil, so that some portions of this steam may pass through same charge more than once.

3. Cooling exhausted charge by drawing air down through it.

4. The combination of a still for essential oils and the steam-circulator E F, or its equivalent, for the purpose set forth.

5. The combination of a still for essential oils and the cooler E K L, Fig. 1, or E F K, Fig. 2, or their equivalents, for the purpose set forth.

6. The combination of one or more stills for essential oils and a hydraulic main; all substantially as and for the purposes hereinbefore described.

GEORGE GILMAN PERCIVAL.

Witnesses:
  ISABEL B. PERCIVAL,
  JAMES H. PLAISTED.